United States Patent [19]
Vriezen

[11] Patent Number: 5,293,600
[45] Date of Patent: Mar. 8, 1994

[54] COUNTER AND FLUX BIT LOCKING FOR VERY FAST SHARED SERIALIZATION OF SHARED DATA OBJECTS

[75] Inventor: John J. Vriezen, Rochester, Minn.

[73] Assignee: International Business Machines Corporation, Armonk, N.Y.

[21] Appl. No.: 505,814

[22] Filed: Apr. 6, 1990

[51] Int. Cl.$^5$ ............ G06F 12/14; G06F 12/16; G06F 9/38

[52] U.S. Cl. .................. 395/425; 395/325; 395/600; 395/775; 364/246.8; 364/969.2; 364/DIG. 1

[58] Field of Search ............ 364/DIG. 1, DIG. 2; 395/425, 325, 775, 600

[56] References Cited

U.S. PATENT DOCUMENTS

| | | | |
|---|---|---|---|
| 4,245,306 | 1/1981 | Bessemer et al. | 395/325 |
| 4,253,144 | 2/1981 | Bellamy et al. | 395/425 |
| 4,253,146 | 2/1981 | Bellamy et al. | 395/425 |
| 4,399,504 | 8/1983 | Obermarck et al. | 395/650 |
| 4,480,304 | 10/1984 | Carr et al. | 395/725 |
| 4,604,694 | 8/1986 | Hough | 395/650 |
| 4,627,019 | 12/1986 | Ng | 395/425 |
| 4,742,450 | 5/1988 | Duvall et al. | 395/700 |
| 4,897,781 | 1/1990 | Chang et al. | 395/600 |
| 4,965,719 | 10/1990 | Shoens et al. | 395/650 |
| 5,089,952 | 2/1992 | Bozman | 395/725 |

FOREIGN PATENT DOCUMENTS 0344712 12/1989 European Pat. Off. ....... G06F 9/46

OTHER PUBLICATIONS

Index Locking and Splitting, IBM Technical Disclosure Bulletin vol. 25, No. 7B Dec. 1982, pp. 3725-3729, T. R. Malkemus.

Index Mini-Pages, IBM Technical Disclosure Bulletin, vol. 25, No. 11A, Apr. 1983, pp. 5460-5463, R. A. Crus; T. R. Malkemus; G. R. Putzolu.

Deadlock Detection and Avoidance for Shared Logical Resources, IEEE Trans. Software Eng. (USA), vol. SE-5, No. 5, pp. 465-471, Sep. 1979, D. J. Rypka, A. P. Lucido.

On the Modeling and Experimental Evaluation of a File System with Distributed Concurrency Control, Proc. 1985 Summer Computer Simulation Conference; SCS, San Diego, Calif., USA, xxxiv+758 pp. 299-304, 1985, A. Hac.

Taradalsky, Morris "Shared Locking Wihout a Lock", IBM Tech Disc Bulletin, vol. 18, No. 5, Oct. 1975 (copyright, 1975).

IBM Fortran Version 1.3 Reference Manual.

Colmark 7 & 8 of Duvall et al 4,742,450.

IBM Technical Disclosure Bulletin, vol. 16, No. 6, Nov. 1973, New York US, p. 1849, McKinstry 'Sterilization of Dependent Processes'.

Primary Examiner—Paul V. Kulik
Assistant Examiner—Paul Lintz
Attorney, Agent, or Firm—Steven W. Roth; Curtis G. Rose

[57] ABSTRACT

Methods and apparatus are set forth for improving the performance of general purpose computing systems that utilize exclusive and shared seize mechanisms to assure the integrity of shared data objects, records, or other unit of synchronization. More particularly, methods and apparatus are set forth which allow concurrent reads of shared data objects in a coherent fashion, without always having to perform a seize. According to a preferred embodiment of the invention, read (shared) accesses can be performed in such a manner as to improve system performance by utilizing a method comprising the steps of: (a) determining, for a particular shared data object to be read, if the object is subject to an exclusive seize prior to any attempt, to read the object; (b) reading the object without causing a shared seize to be initiated if it was not subject to an exclusive seize as determined in step (a); (c) determining if the object is subject to an exclusive seize after reading it in accordance with step (b); and (d) determining if the object was subject to an exclusive seize while it was being read. If, as a result of performing the aforestated method, it can be concluded that the read took place without an exclusive seize immediately before, during and just after the read, then the data can be presumed valid. System performance is improved in such cases since the overhead associated with initiating a seize for the read is eliminated.

37 Claims, 3 Drawing Sheets

COUNTER AND FLUX BIT LOCKING FOR VERY FAST SHARED SERIALIZATION OF SHARED DATA OBJECTS

BACKGROUND OF THE INVENTION

1. Field of the Invention

The invention relates generally to methods and apparatus for managing access to shared data in a data processing system. More particularly, the invention relates to methods and apparatus which allow multiple accessors of shared data to read and modify such data in a fast and orderly manner while assuring the integrity of the shared data.

2. Description of the Related Art

Many techniques are known for managing access to shared data in data processing systems. The general objects of such techniques (commonly referred to as data base management techniques) are to prevent shared data from being modified by two (or more) different accessors at the same time, and to prevent data from being read while it is being modified. These objects are typically achieved by using some sort of system synchronization function, commonly called "Lock" or "Seize".

The choice of the data base management technique used may depend on how the data is organized, what the system throughput requirements are, what the projected activity is with respect to shared item accesses, etc. Conversely, these factors can be affected by the choice of data base management technique as well. For example, the granularity at which the aforementioned synchronization is performed can have a significant effect on system performance as measured in terms of system overhead and throughput.

In systems like the commercially available IBM S/38 and AS/400, synchronization is performed at the data base file level where a file is a (potentially) large number of discrete data entities called records. This is efficient in terms of synchronization overhead, since many records can be processed with one synchronization. However, if there are many accessors each wishing to operate on different records within the same file, each is serialized, and throughput suffers. This contention can lead to severe performance problems, particularly when operations on very active objects must be serialized.

Other known commercially available systems, like the DB2 and SQL/DS which run on the IBM system 370, synchronize at either a page or record level. This reduces(compared with file level synchronization techniques) contention among multiple accessors that wish to operate oil separate areas of the file; however, additional overhead is introduced since each page or record must be synchronized to process many records sequentially. In most systems, the processing overhead required to acquire and release a lock can be very significant and hence, synchronizing at the page or record level may be impractical or undesirable.

The aforementioned synchronization function itself may be carried oat in different ways, each of which has its own impact on system performance. For example, synchronization may be accomplished through the use of a lock manager that uses "shared" and "exclusive" locks to protect shared data.

It is well known to protect data from being changed during a read operation with a "read" (shared) lock that excludes writes, but which allows shared access to (i.e., allow other reads of) data protected by the lock. Such a lock would assure that no modification to protected data is possible while the read lock is in effect.

"Read/write" (exclusive) locks typically exclude all read and write access to the portion of storage managed by the lock, other than read or write accesses initiated by the lock holder.

Shared and exclusive locking techniques employed at the record level are particularly costly from an overhead point of view. As the size of the data base goes up, significant amounts of time can be expended locking and unlocking individual data records, as indicated hereinabove with reference to DB2 and SBL/DS. Degradation of system performance (due to increased CPU utilization) is likely to occur in certain instances as a result of utilizing such techniques.

Many articles and inventions have been directed to improving data base management techniques for computer systems generally, and particularly those that organize data in the form of discrete records. For example, in the IBM Technical Disclosure Bulletins Volume 25, No. 7B, published in December of 1982, pp. 3725-3729, and Volume 25, No. 11A, published in April of 1983, pp. 5460-5463 techniques for locking portions of tree form indices are described, where the record oriented trees provide keyed access to a data base.

U. S. Pat. Nos. 4,480,304 and 4,399,504, in the context of a data base system distributed across a loosely coupled multiple processor architecture, describe lock managers that use hash tables to maintain the lock status of discrete shared resources. In particular, the hash tables are used as part of a shared/exclusive access system which record (in the hash tables) which locks are held by the various potential accessors.

The systems described in the U.S. Pat. Nos. 4,480,304 and 4,399,504 references require the expenditure of lock manager overhead for every access of shared data (again, very expensive when management is performed at the record level), and the further expenditure of lock manager overhead in the event of hash table "collisions" (two sets of lock information mapping into a single hash table entry). In particular, data chaining off a hash table entry is used whenever a hash collision occurs to preserve data necessary in implementing the lock management schemes taught by the references.

U.S. Pat. No. 4,604,694 describes a fast means of acquiring a shared lock and recording the shared lock acquisition. Once the lock is obtained, the shared resource can be examined without risk of interference from another exclusive lock holder. The techniques taught in the U.S. Pat. No. 4,604,694 patent require the acquisition of a shared lock to assure data integrity even though no exclusive seize necessarily occurs during the performance of the read. In instances where the seize shared lock is acquired and no exclusive seize intervenes, the overhead associated with acquiring the shared lock is, in effect, wasted.

Still other shared data management schemes are known that are not lock oriented. For example, U.S. Pat. No. 4,627,019, accomplishes data base access control by "versioning", i.e., by maintaining multiple copies of data rather than by locking. Such techniques can be problematic because of storage requirements, copy maintenance overhead, etc.

None of the known techniques for assuring the integrity of shared data, particularly none of the techniques that employ lock managers to oversee and implement shared and exclusive locking schemes, effectively deal with the aforementioned system overhead and throughput performance problems.

Accordingly it would be desirable to provide methods and apparatus which improve the overall system performance of those systems that utilize shared and exclusive locks to manage access to shared data. In particular, it would be desirable to be able to provide methods and apparatus which only cause seizes to be initiated in certain predefined instances for reads of shared data and which, in other instances, are able to assure the integrity of a shared read without having to incur the significant overhead typically associated with a seize.

Furthermore, it would be desirable to be able to provide methods and apparatus, for use in systems having shared data resources, which reduces the contention in such systems that traditionally seize or lock the file or object level.

Still further, it would be desirable to be able to reduce the processing overhead (and thereby improve the throughput of) those systems that lock or seize at the page or record level.

Further yet, it would be desirable to be able to provide methods and apparatus which can be useful in improving system performance in situations where shared and exclusive access modes must be provided for a large number of objects on an individual basis. This is particularly desirable in situations where a great deal more read (shared) access is expected to be performed than write (exclusive) access.

SUMMARY OF THE INVENTION

It is a primary object of the invention to provide methods and apparatus for performing exclusive and shared serialization of shared data objects, records or other synchronization units in a manner which reduces the overhead typically expended performing read (shared) type accesses.

It is a further object of the invention to provide methods and apparatus, for use in systems having shared data resources and which reduces contention in systems that traditionally seize or lock at the file or object level, and which reduce the processing overhead for those systems that lock or seize at the page or record level.

It is still a further object of the invention to provide methods and apparatus that initiate relatively few expensive seize operations (for reads) when compared with known methods for reading shared data. In particular, it is an object of the invention to provide methods which allow concurrent reads of shared data objects without always having to seize such objects.

According to the invention, a method and apparatus is set forth for improving the performance of general purpose computing systems that utilize exclusive and shared seize mechanisms to assure the integrity of shared data objects, by first determining (for a read) if a shared lock is permissible, and if so, performing the read without acquiring the lock.

Once the access is complete, a check is made to see if an exclusive lock is or was present since the initial determination that a shared lock was permissible. If no intervening exclusive lock occurred, the data read is assured to be valid even though no shared lock was ever acquired. In effect, the invention selectively performs shared seizes, eliminating the overhead associated with such seizes in situations where the expenditure of such overhead would be unnecessary.

More particularly, the method comprises the steps of (a) determining, for a particular data object to be read, if the object is subject to an exclusive seize prior to any attempt to read the object; (b) reading the object without causing a shared seize to be initiated if it was not subject to an exclusive seize as determined in step (a); (c) determining if the object is subject to an exclusive seize after reading it in accordance with step (b); and (d) determining if the object was subject to an exclusive seize while it was being read.

If the method steps set forth above indicate that the read took place without an exclusive seize immediately before, during and just after the read, then the data is most assuredly valid and no shared seize needed to be initiated to perform the valid read.

In instances where integrity cannot be guaranteed the invention contemplates attempting a certain number of retries (still expending less overhead than if a shared seize is initiated), and only in certain instances, requires a shared seize to be performed (i.e., to wait for the exclusive user to finish modifying the record and then seizing the record for the period during which the read is to be performed).

According to a preferred embodiment of the invention, a hash table is used to maintain a check count which in turn may be used to verify whether or not an exclusive seize took place while an object was being read. The novel method utilizes both this check count and a "flux" bit (which will be explained in greater detail hereinafter) to make the various determinations required by the aforestated (and other) method steps.

The invention features improved system performance, particularly where a large number of reads (as compared to writes) of shared data objects needs to be performed. System performance improves further as the number of active data objects increases. Additionally, the invention features a way to minimize contention in systems that lock at the file or object level, and improve throughput in systems that lock at the page or record level.

Still further, the invention features methods that can be used in both tightly coupled and loosely coupled microprocessor systems. Further yet, the novel methods are easily implemented via horizontal microcode, as part of operating system software, or as part of a data base management system, etc., in the form of re-entrant code, in the form of multiple copies of software, etc., as the application dictates.

These and other objects and features of the present invention and the manner of obtaining them will become apparent to those skilled in the art, and the invention itself will be best understood by reference to the following detailed description read in conjunction with the accompanying Drawing.

DETAILED DESCRIPTION

Figure 1:
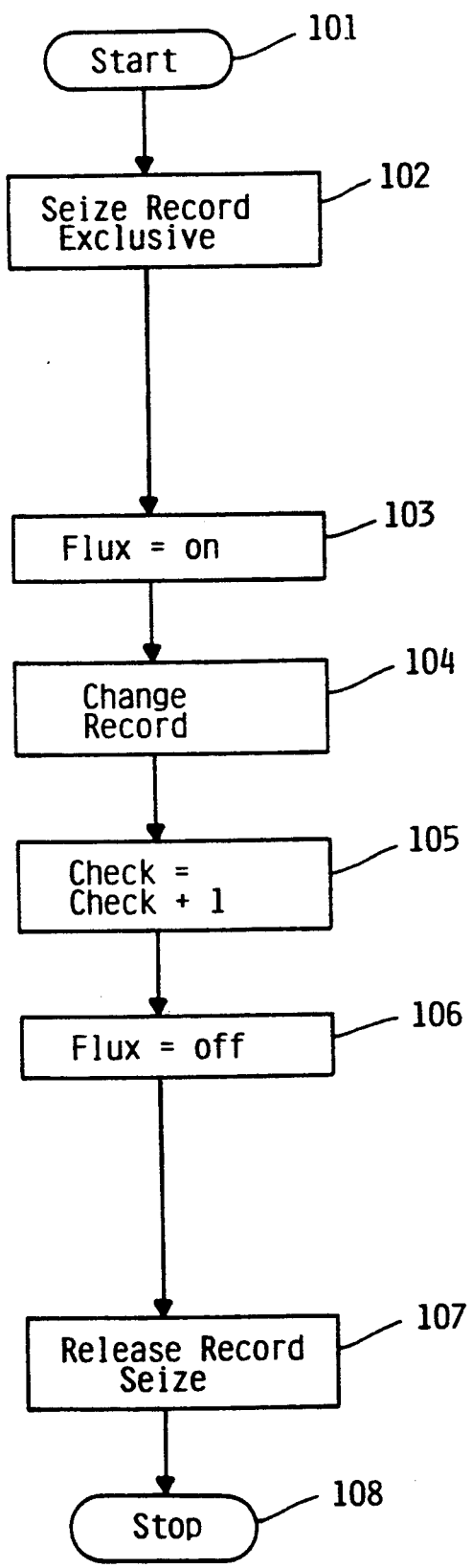
FIG. 1 is a flowchart that illustrates a first set of method steps that, in accordance with a preferred embodiment of the invention, may be used when performing write (exclusive) accesses on shared data to realize the objects of the invention.
Figure 2:
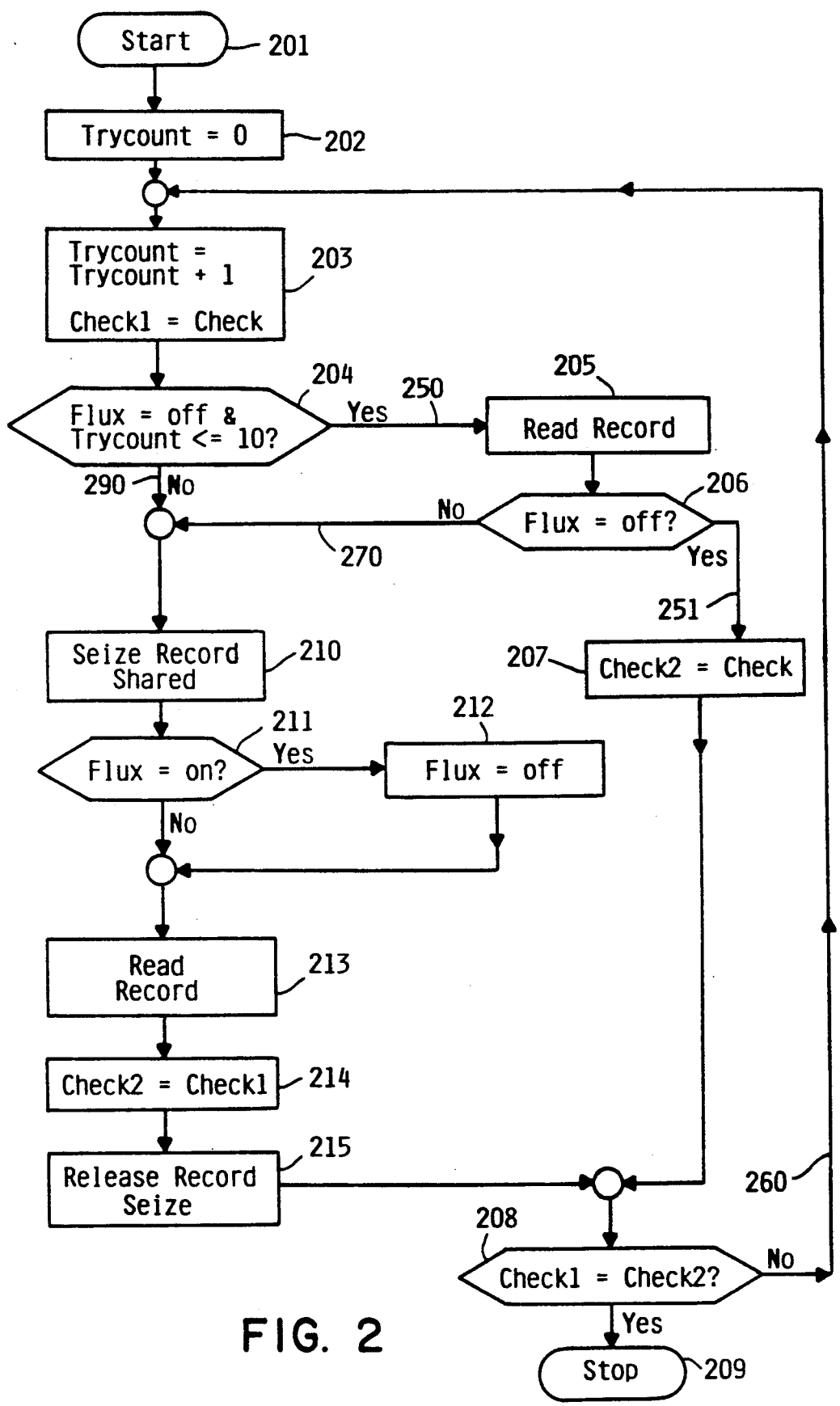
FIG. 2 is a flowchart that illustrates a second set of method steps that, in accordance with a preferred embodiment of the invention, may be used when performing read (shared) accesses on shared data to realize the objects of the invention.
Figure 3:
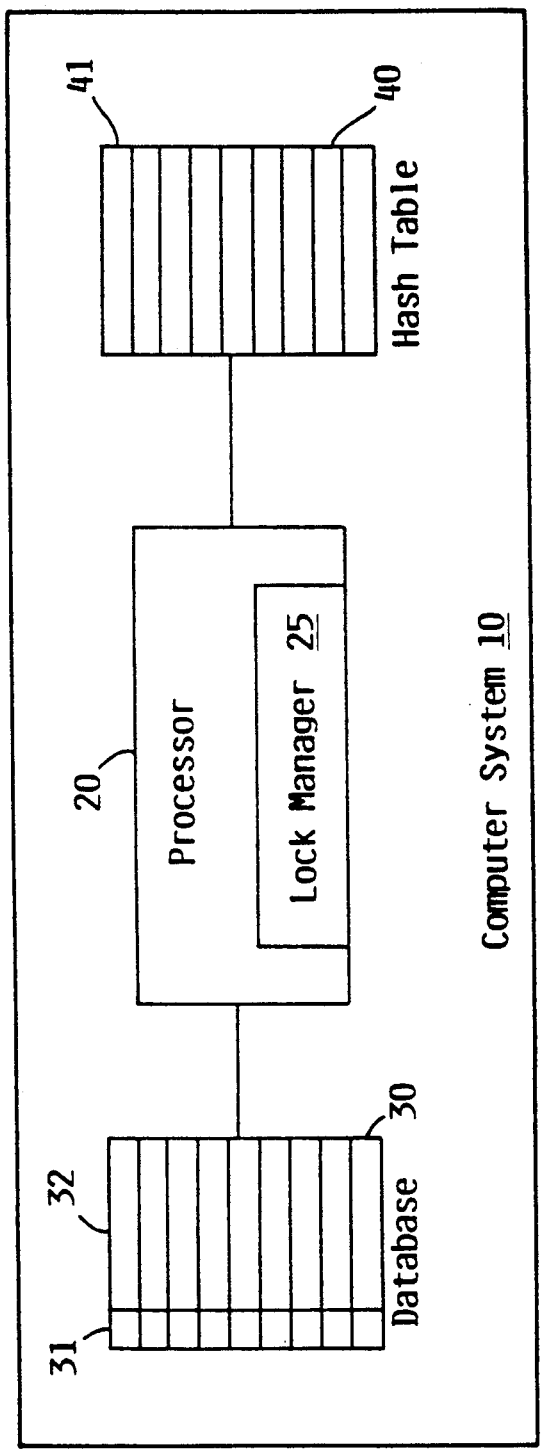
FIG. 3 shows a block diagram of the computer system of the invention.

The invention can be easily understood with reference to FIGS. 1-3 which illustrate, in terms of flowcharts, how a preferred embodiment of the invention can be implemented on a computer system via a first and second set of depicted method steps. These flowcharts will be described in detail hereinafter following an explanation of the operating principles of the invention together with an explanation of how the invention achieves its objectives.

It should be understood that L-,he method steps of the invention are designed to utilize (work in cooperation with) a lock manager having the capability of implementing the seize (any necessary waiting periods and the lock itself) for a write (exclusive) access and/or read (shared) access of a shared data object. Examples of lock manager mechanisms suitable for use with the instant invention are well known to those skilled in the art, and include those mechanisms set forth in the U.S. Patents referred to hereinbefore.

In general, an exclusive seize attempt will be successful so long as no other seize of the data object is in force. A shared seize attempt will be successful so long as no other exclusive seize of the data object is in force.

In the description of the invention that follows, whenever the term "record" or "data object" is used, it should be understood that it is used for the sake of convenience only, and that this term could in each instance be replaced by the relevant synchronization unit.

According to the invention, a mechanism must first be provided to indicate that a record (or data object or other synchronization unit) is currently being modified by a holder of an exclusive seize on the record, or that the record was being modified by a holder of an exclusive seize when the system terminated abruptly. Generally, locks or seizes are not retained across system terminations.

This mechanism can be implemented by allocating one bit for each record (or data object or other unit of synchronization) in the system. Thus, for example, in a system like the AS/400, where each record in the data base contains a leading byte, called the "Data Space Entry Status Byte," or "DENT" byte (which contains control information about the record) the bit can be allocated in such a byte. Other mechanisms may be utilized to provide the desired indication without departing from the spirit or scope of the invention.

Where a bit is used, as contemplated by the preferred embodiment of the invention, it may be thought of as a "flux" bit (and will be referred to as such hereinafter) since it is normally "on" (set) wherever a record is in flux (i.e., being updated or deleted).

Furthermore, according to a preferred embodiment of the invention, each record will also have an n-bit integer value associated with it. This association is preferably not one to one, (i.e., one integer per unit). Rather, to conserve space, a table of integers should be maintained for the entire system. In one embodiment of the invention, with n equal to 16, a table of several thousand integers results, far fewer than the likely number of records contained in a typical computer system's files.

A preferred embodiment of the invention uses a hash function to map each record in the system to a particular entry in the table. The integers in the table are referenced to hereinafter as "check counts". Still further, according to this embodiment of the invention, a check count is changed each time any data object which hashes to it is changed. This check count can be used to determine if a given data object was changed (via an exclusive access), as an integral part of the method contemplated by the invention for performing shared read accesses. This will become apparent from the following description of how, according to the invention, exclusive and shared accesses are to be performed.

The method for performing exclusive accesses is relatively simple. First, an exclusive seize is acquired (via the lock manager of a given system, using whatever techniques are available in the given system for implementing the seize) for the record. Those skilled in the art will readily appreciate that exclusive access is much less frequent than, and therefore the cost of acquiring a seize is not as important as, the shared access case discussed hereinafter.

After acquiring the seize, the flux bit associated with the record (e.g., an allocated bit in a DENT byte in an AS/400 system), is turned on. The change is then made to the record (update or delete), followed by incrementing a check count associated with the record to indicate a change occurred. After this, the flux bit is turned off, and finally the exclusive seize is released.

Shared access is a bit more complicated. However, by using the methods set forth herein, shared access will not, in most cases, require a seize. According to the invention, a seize will only be required in cases where a conflict may exist.

Shared access is preferably performed by first recording the current value of the aforementioned check count (for the particular record being read) for later use. Next, the flux bit is tested. If the flux bit is on (set) the record, according to the preferred embodiment of the invention, must be seized shared. This forces a wait for the modification by the exclusive user to complete. However, as indicated hereinbefore, no conflict will exist for most attempted reads of shared data, and thus no seize will normally be needed.

If a seize is required in order to perform the read, and if the flux bit is still on, it can be safely turned off. The only condition that could cause the flux bit to be on after acquiring the shared seize is where the record was being modified during a prior abnormal system termination. Once the record is seized shared, the record can be read (copied) without interference from modifiers of the record.

If the flux bit is off when the shared access is initiated (the more likely case), this tells the shared user that no modification is currently taking place. At this point, the record is read, this time without a shared seize.

It is possible that a modifying process may acquire an exclusive seize during the read operation, and change the record. According to the invention, the reader should sample the flux bit after the read operation to see if a modification had started during the read. If it has, the reader should, according to the preferred embodiment of the invention, ignore the record read, acquire a shared seize, (thus waiting for the modification to be completed) and read the record again.

If the record was not being modified at the start of the read and was not being modified at the end of the read, there is still no guarantee that the record was not being modified during the read operation. An exclusive access modifier may have done all of its work after the reader's first check and finished before the reader's second check. For this reason, the reader should also sample the check count to be sure it has not been changed.

If a modification was done during the read, the check count would have been changed. If no change in the check count has occurred since its first being recorded, then a successful read operation has been performed. If a change is detected, the entire read operation is, according to the preferred embodiment of the invention, retried. Optionally, if after several retries the reader has no success, it can seize the record in a shared mode to assure success. Relatively few retries would be likely in a typical system.

According to the invention, the check counts should be implemented so that the aforementioned hash function provides a good distribution among the entries in the check count table. In a system like the AS/400, this might best be done by XORing the ordinal number of the data space entry with the segment identification of the data space entry address, and using some number of the low order bits to select a table entry. If only the ordinal number is used, the lower part of the table will be favored since all files have low record numbers, but not all have high record numbers.

The table size should also be sufficiently large (i.e., the choice of the variable n should be sufficiently large) so that it will be statistically very unlikely that two processes in the system operating on different records at any given time will hash to the same table entry. Thus the size of the table should be proportional to the number of the processes in the system.

Even where a collision occurs, no chaining or other significant overhead is normally expended; the cost is normally only another iteration (retry) of the shared read method described hereinbefore.

Having described the details of the methods contemplated by the invention, reference should be made to FIGS. 1 and 2 which further illustrate and summarize the methods in the form of flowcharts, performed on the computer system shown in FIG. 3.

FIG. 1 is a flowchart that illustrates a first set of method steps that, in accordance with a preferred embodiment of the invention, may be used when performing write (exclusive) accesses on shared data to realize the objects of the invention.

According to the invention, whenever an accessor (task, process, etc.) determines to perform an exclusive access, the method steps shown in FIG. 1 are performed on suitably programmed processor 20 of computer system 10 (FIG. 3). In the preferred embodiment, computer system 10 is an Application System/400 Midrange Computer, although it could be any computer system.

After entering the depicted exclusive access mechanism contemplated by the invention (at 101), a seize record exclusive is always performed, as shown in block 102. It should be recalled that this is a lock manager function well known in the art (performed by lock manager 25 of FIG. 3), and results in either an immediate seize of the record (shared data object) if no other seize has a hold on the record, or results in the commencement of a waiting period which lasts until the record can be seized by the lock manager.

Once the seize is successful, the aforementioned flux bit is turned on as illustrated at block 103. FIG. 3 shows flux bit 31 preceeds each record or object 32 in database 30 located in computer system 10. Database 30 can be any data shared by multiple processes in computer system 10. The format of database 30 can vary based on the computer chosen for computer system 10. In the preferred embodiment, the format of database 30 is defined by the Operating System/400.

Next, the record can be changed (modified or deleted) on an exclusive basis, as shown at block 104.

After changing the record, the check count for the record is increased by one (to indicate a change) as shown in block 105 and the flux bit is turned off (block 106), to indicate to other potential accessors that a seize may be had with respect to the record that was just modified. FIG. 3 shows hash table 40 which contains a plurality of check counts such as check count 41. In the preferred embodiment, check count 41 is 16 bits long, but may be larger or smaller and still fall within the scope of the invention.

Finally, the seize is released (block 107) and the novel method (as applied to exclusive accesses) terminates (block 108).

Now, referring to FIG. 2, it can be easily understood how the methods depicted in FIGS. 1 and 2 interact.

It should be recalled that FIG. 2 depicts a flowchart that illustrates a second set of method steps that, in accordance with a preferred embodiment of the invention, may be used when performing read (shared) accesses on shared data to realize the objects of the invention.

According to the invention, whenever an accessor determines to perform a shared access, the method steps shown in FIG. 2 are followed.

After entering the depicted shared access mechanism contemplated by the invention (at 201), a count (shown as "Trycount" in block 202) is initiated (e.g., set equal to zero), a variable (shown as "check1") is set equal to "check" (the aforementioned check count for the data object being operated on by hashing to the table of check count values), and Trycount is incremented to indicate the first attempt at the read without having to perform a seize (block 203).

According to the preferred embodiment of the invention, the Trycount variable keeps track of the number of tries to accomplish a given read of a shared data object without having to initiate a seize. An arbitrary threshold for a permissible number of tries (10 in the illustrative embodiment of the invention shown in FIG. 2), may be chosen before forcing a seize of the shared record. Blocks 203 and 204 of FIG. 2 depict the Trycount variable being incremented (block 203) and examined (at block 204), with path 290 being taken in the event Trycount ever exceeds the threshold. The steps taken if the method takes path 290 will be explained in detail hereinafter after an explanation of the more routine path in FIG. 2, path 250.

Before explaining path 250, it should also be noted that path 290 will be taken even when Trycount is less than or equal to the threshold (even on the first try) if the aforementioned flux bit is "on", i.e., when an exclusive seize of the desired record is determined to be in progress.

Only when the Trycount threshold has not been exceeded and an initial determination is made (at block 204) that an exclusive seize is not in progress (i.e., that the flux bit is off) will path 250 be taken.

In this event, the record will be read (at block 205) without expending overhead for a shared record seize. Those skilled in the art will readily appreciate that the "read" is provisional, i.e., the read called for at some higher level in the system is not actually accomplished until it is verified as valid in accordance with the further method steps to be described herein. Accordingly, some may wish to think of the "read" at block 205 as merely making a copy of the data object.

After completing the read (copy), the flux bit will again be examined (block 206) to determine if an exclusive seize is in progress. The best case scenario is that the flux bit is again determined to be off and that path 251 is taken.

When path 251 is taken, all that remains to be determined is if an exclusive seize and release took place during the read, a situation which cannot be determined by having examined the flux bit at blocks 204 and 206. To understand how this determination is made, it should be observed that the variable check1 (shown as block 203) was set equal to "check" (the check count for the record) before the read at block 205, and that the variable check2 is set equal to the check count at block 207.

At block 208, these counts (check1 and check2) are compared. If they are equal, no exclusive access took place during the read, since an exclusive access would have increased the check count as shown in FIG. 1 at block 105.

In this case, the method terminates successfully at block 209, i.e., a successful read of valid data was accomplished without having to expend the overhead for a seize.

Since the overhead of taking path 250 and 251 with a successful check at block 208, is much less than the overhead typically associated with a shared seize, system performance is improved.

System performance is even improved where a number of retries are required to accomplish the shared read without a seize. For example, if the determination at block 208 fails (i.e., if an exclusive access took place during the read), the read performed at block 205 is discarded, path 260 is taken, and block 203 is again entered. The Trycount is increased, the check1 variable is set to reflect the present value of the variable check, and the method proceeds as indicated hereinabove (either down path 290 or path 250).

Two paths depicted in FIG. 2 remain to be explained, path 270 and path 290. Path 270 is taken if the flux bit is determined to be on at block 206. Path 290 is taken if either the flux bit is determined to be on at block 204, or if the Trycount threshold is exceeded. According to the preferred embodiment of the invention, a seize record shared function i-s performed whenever either of these two paths is taken since a conflict for access to the shared record may exist. In fact, paths 270 and 290 result in the same set of method steps being performed starting at block 210.

The seize is initiated at block 210. Just prior to performing the read (copy), the flux bit is tested at block 211. If it is on, the bit is forced off at block 212 since the only condition that could cause the bit to be set after acquiring the shared seize at block 210 is where the record was being modified prior to an abnormal system termination.

After making sure the flux bit is reset (for a subsequent user of the method) following an abnormal termination, the read is performed (at block 213) without interference from any potential modifier of the record.

Next, the check2 variable is forcibly set to the value of the check 1 variable (at block 214), so that after the seize is released (at block 215), the check counts will be determined to be equal (at block 208), and the method will terminate (block 209).

As can be seen from the flowchart just described, paths 270 and 290 assure the integrity of shared data by initializing a shared seize. However, it can also be clearly seen that a shared seize can be completely avoided in certain instances. Accordingly, by following the method steps depicted in FIGS. I and 2, the invention can be implemented.

What has been described hereinabove are methods for performing exclusive and very fast shared serialization of shared data. These methods allow all of the objectives of the invention, as set forth hereinbefore, to be accomplished.

Those skilled in the art will recognize that the foregoing description and examples included therein, have been presented for the purposes of illustration and description only. The description set forth is not intended to be exhaustive or to limit the invention to the precise form disclosed. Obviously, many modifications and variations are possible in light of the above teaching without departing from the scope or spirit of the invention.

For example, so long as the Trycount threshold is not exceeded, a loop (or loops) could be established which facilitate a retry of the method whenever the flux bit is determined to be on, rather than calling for a seize at such point in time. Thus, path 270 of FIG. 2 could, for example, be joined to block 203 rather than with path 290.

Such an embodiment would trade off an expenditure of CPU resources versus waiting for a task to complete in a seize lock wait. Accordingly, this alternative embodiment may not be preferred in applications where CPU resources are at a premium; however, this embodiment is indeed a possibility contemplated by the invention.

The embodiments and examples set forth herein were presented in order to best explain the principles of the instant invention and its practical application to thereby enable others skilled in the art to make and use the instant invention in various embodiments and with various modifications as are suited to the particular use contemplated.

What is claimed:

1. A method for managing access to shared data in a data processing system, comprising the steps of:
   (a) initializing an n bit check count to keep track of each instance where an exclusive write access modifies a given shared data object;
   (b) storing said check count in a has table; and
   (c) setting a flux bit whenever said data object is subject to an exclusive seize, so that any shared read access initiated while said flux bit is set will initiate a shared seize prior to reading the data object.

2. A method as set forth in claim 1 further comprising the steps of:
   (a) incrementing said check count each time an exclusive write access causes said data object to be modified;
   (b) accessing said check count both before and after reading said given data object when performing a shared read access with respect to said data object, to determine if an exclusive access modified said data object during the performance of said shared read access;
   (c) disregarding the shared read if the accessed check count values accesses in step (b) are not equal; and
   (d) completing said shared read access without having performed a shared seize whenever said check count values are equal.

3. A method for improving the performance of a computing system that utilizes exclusive and shared seize mechanisms to assure the integrity of shared data objects, comprising the steps of:
   (a) initiating a shared read for a particular shared data object;
   (b) determining if said object is subject to an exclusive seize prior to any attempt to read the object;
   (c) reading said object without initiating a shared seize whenever the object is not subject to an exclusive seize as determined in step (b);
   (d) determining if the object is subject to an exclusive seize after performing step (c); and
   (e) determining, whenever said object is not subject to an exclusive seize as determined in step (d), if the object was subject to an exclusive seize while being read; and
   (f) completing said shared read without having initiated a shared seize, thereby improving system performance, whenever it is determined by the performance of steps (b), (d) and (e) that no exclusive seize affected the validity of said shared data object since the initiation of said read.

4. A method as set forth in claim 3 wherein said step (b) is performed by examining the condition of a flux bit associated with said object, wherein said flux bit is set whenever said object is subject to an exclusive seize.

5. A method as set forth in claim 3 wherein said step (d) is performed by examining the condition of a flux bit associated with said object, wherein said flux bit is reset whenever said object is not subject to an exclusive seize.

6. A method as set forth in claim 3 wherein said step (e) is performed by maintaining a check count that is incremented whenever said shared data object is subject to an exclusive seize and modified by an exclusive write access.

7. A method as set forth in claim 4 wherein said check count is stored in a hash table.

8. A method as set forth in claim 6 wherein steps (b)–(e) are performed iteratively whenever it is determined by the performance of step (e) that said object was modified by an exclusive write access while being read.

9. A method as set forth in claim 8 wherein the number of iterative performances 94 steps (b)–(e) is limited by a predefined retry threshold value.

10. A method as set forth in claim 9 further comprising the step of performing a shared seize whenever said predefined threshold value is met.

11. A method for managing access to shared data in a data processing system, wherein said data processing system utilizes exclusive and shared seize mechanisms to assure the integrity of shared data objects, comprising the steps of:
   (a) initiating an exclusive write for a particular shared data object, including initiating an exclusive seize of said object;
   (b) setting a flux bit associated with said object whenever an exclusive seize is acquired;
   (c) initializing and maintaining an n bit check count for keeping track of each instance where said data object is modified by an exclusive write access;
   (d) modifying said given data object via said exclusive write;
   (e) incrementing said check count after said data is modified via said exclusive write;
   (f) resetting said flux bit when said object is no longer subject to said exclusive seize; and
   (g) terminating said exclusive write.

12. A method as set forth in claim 11 further comprising the steps of:
   (a) determining and storing the value of said check count after a shared read operation is initiated but prior to reading said data object, said shared read operation being initiated to obtain data;
   (b) determining and storing the value of said check count after reading said data object but prior to completing said shared read operation;
   (c) comparing the check count value determined and stored in accordance with steps (a)–(b); and
   (d) invalidating said data whenever said check count values are different.

13. A method as set forth in claim 12 further comprising the step of retrying said shared read whenever said check count values are different.

14. A method as set forth in claim 13 wherein said step of retrying is performed only so long as said check counts differ and a predetermined retry threshold value is not met.

15. A method as set forth in claim 14 further comprising the step of initiating a shared seize whenever said predetermined retry threshold is met.

16. A method as set forth in claim 14 further comprising the step of completing said shared read, without initiating a shared seize, so long as said flux bit remains reset during the performance of said shared read and said check count values are the same.

17. A method as set forth in claim 12 further comprising the step of initiating a shared seize whenever it is determined during the performance of a shared read that said flux bit is set.

18. A method as set forth in claim 12 further comprising the step of retrying said shared read if it is determined during the performance of said shared read that said flux bit is set.

19. A method as set forth in claim 11 wherein the value of n is such that there does not exist a one to one correspondence between the number of shared data objects in said system and the maximum possible number of check count values, and further wherein said check count values are stored in a table accessible via a hash function mapping at least one shared data object into a given table entry.

20. A method for managing access to shared data in a computing system in which a plurality of tasks may be executed concurrently utilizing a shared data base, wherein said computing system includes a lock manager for performing read (shared) accesses and write (exclusive) accesses with respect to shared data objects in said data base through the use of exclusive and shared seize mechanisms, comprising the steps of:
   (a) initializing a counter to keep track of shared read attempts with respect to a particular shared data object whenever a shared read access in initiated for that object;
   (b) incrementing said counter;
   (c) initializing a first check count variable by setting it equal to a check count associated with said particular data object, wherein said check count is a variable that is incremented whenever a modification is made to said particular data object under an exclusive seize;
   (d) testing a flux bit which is set whenever said particular data object is subject to an exclusive seize;
   (e) reading said particular shared data object so long as a flux bit is reset and the value in said counter after performing step (b) is less than a predetermined threshold value;

(f) determining if said particular data object is subject to an exclusive seize after performing step (e) by again testing said flux bit;

(g) determining, whenever said particular data object is not subject to an exclusive seize as determined in step (f), if said particular data object was subject to an exclusive seize while it was being read; and (h) terminating said shared read access successfully without having initiated a shared seize whenever it is determined in step (g) that said particular data object was not subject to an exclusive seize while it was being read.

21. A method for improving the performance of a computer system utilizing exclusive and shared seize mechanisms to assure the integrity of shared data objects, comprising the steps of:

(a) setting a flux bit whenever an exclusive write access is in progress and a shared data object is subject to an exclusive seize;

(b) incrementing a check count whenever said shared data object is modified during said exclusive write access;

(c) resetting said flux bit whenever said shared data object is no longer subject to said exclusive seize;

(d) testing said flux bit whenever a shared read access for said shared data object is initiated; and (e) performing a shared seize with respect to said shared data object whenever a shared read access is initiated for said shared data object and said flux bit is set.

22. A method as set forth in claim 21 further comprising the steps of:

(a) reading said shared data object without performing a shared seize, whenever said flux bit is not set;

(b) testing said flux bit after performing said read; and (c) performing a shared seize with respect to said shared data object whenever said flux bit is set after performing said read.

23. A method as set forth in claim 22 further comprising the steps of:

(a) storing the value of said check count in a first storage means prior to performing said read;

(b) storing the value of said check count in a second storage means after performing said read so long as said flux bit is not set after said read;

(c) comparing the value of said check count as stored in said first and second storage means;

(d) disregarding said read if said check count values as stored in said first and second storage means are not equal; and (e) completing said shared read access without having performed a share seize whenever said check count values as stored in said first and second storage means are equal.

24. A method as set forth in claim 23 further comprising the steps of:

(a) retrying said shared read access whenever said read is disregarded so long as a predetermined retry threshold is not exceeded and said flux bit remains reset; and (b) performing a shared seize for said data object when performing said shared read access whenever said retry threshold is exceeded or said flux bit is set.

25. A method for improving the performance of a computer system utilizing exclusive and shared seize mechanism to assure the integrity of shared data objects, comprising the steps of:

(a) maintaining a check count in a hash table for each of a plurality of shared data objects, wherein the address of the check count in said table for a given shared data object is obtained via performing a hash function on the address in said system of said shared data object;

(b) utilizing said check counts to determine if a shared read access with respect to said given object can be performed without having to seize said object;

(c) incrementing said check count whenever said shared data object is modified by an exclusive write access while subject to an exclusive seize;

(d) setting a flux bit whenever said shared data object is subject to an exclusive seize; and (e) resetting said flux bit whenever said shared data object is no longer subject to said exclusive seize.

26. A method as set forth in claim 25 further comprising the step of forcing a shared seize of said data object whenever a shared read is initiated and said flux bit for said data object is set.

27. A method as set forth in claim 25 further comprising the step of forcing a shared seize of said data object after a predetermined number of attempts to perform said shared read without having to perform said shared seize.

28. A method as set forth in claim 27 further comprising the step of completing said shared read without having initiated a shared seize so long as the flux bit for said object is not set after said shared read is initiated and said check count indicates that said shared data object was not modified during said read.

29. An apparatus for improving the performance of a computing system that utilizes exclusive and shared seize mechanisms to assure the integrity of shared data objects, said apparatus comprising:

(a) means for initiating a shared read for a particular shared data object;

(b) means for determining if said object is subject to an exclusive seize prior to any attempt to read the object;

(c) means for reading said object without initiating a shared seize whenever the object is not subject to an exclusive seize;

(d) means for determining if the object is subject to an exclusive seize after said object has been read;

(e) means for determining if the object is subject to an exclusive seize while being read; and (f) means for completing said shared read without initiating a shared seize to improve system performance if no exclusive seize has been determined.

30. The apparatus as claimed in claim 29 wherein said means for determining if said object is subject to an exclusive seize prior to any attempt to read the object includes a flux bit associated with said object and means for examining the condition of said flux bit to determine if said object is subject to an exclusive seize, said flux bit being set whenever said object is subject to an exclusive seize.

31. The apparatus as claimed in claim 29 wherein said means for determining if the object is subject to an exclusive seize after said object has been read includes a flux bit associated with said object and means for examining the condition of said flux bit, wherein said flux bit is reset whenever said object is not subject to an exclusive seize.

32. The apparatus as claimed in claim 29 wherein said means for completing includes means for maintaining a check count and incrementing said check count whenever said shared data object is subject to an exclusive seize.

33. An apparatus for managing access to shared data in a data processing system including a computing system utilizing exclusive and shared seize mechanisms to assure the integrity of shared data objects, said apparatus comprising:
 (a) means for initiating an exclusive write for a particular shared object, said means for initiating including means for initiating an exclusive seize of said objects;
 (b) a flux bit associated with said object and means for setting said flux bit whenever an exclusive seize is acquired;
 (c) means for initializing and maintaining an n bit check count for keeping track of each instance where said data object is modified by an exclusive write access;
 (d) means for modifying said data object via said exclusive write;
 (e) means for incrementing said check count after said data is modified via said exclusive write;
 (f) means for resetting said flux bit when said object is no longer subject to said exclusive seize; and
 (g) means for terminating said exclusive write.

34. The apparatus as set forth in claim 33 further comprising:
 (a) means for determining and storing the value of said check count after a shared read is initiated but prior to reading said data objects;
 (b) means for determining and storing the value of said check count after reading said data object but prior to completing said shared read;
 (c) means for comparing said determined check count values; and
 (d) means for invalidating the read of said object whenever said determined check count values are different from each other.

35. An apparatus for managing access to shared data objects in a computing system in which a plurality of tasks may be executed concurrently utilizing a shared data base, wherein said computing system includes a lock manager for performing read (shared) accesses and write (exclusive) accesses with respect to said shared data objects in said base through the use of exclusive and shared seize mechanisms, said apparatus comprising;
 (a) means for initiating and acquiring an exclusive seize via said lock manager with respect to a given data object whenever an exclusive access with respect to said given data object is initiated by one of said plurality of tasks;
 (b) a flux bit and means for setting said flux bit after said seize is acquired;
 (c) means for modifying said given data object after said flux bit has been set;
 (d) means for incrementing a check count to signify that a modification of said given data object has occurred;
 (e) means for resetting said flux bit; and
 (f) means for releasing said exclusive seize after said flux bit has been reset.

36. An apparatus for managing access to shared data in a computing system in which a plurality of tasks may be executed concurrently utilizing a shared data base, wherein said computing system includes a lock manager for performing read (shared) accesses and write (exclusive) accesses with respect to shared data objects in said data base through the use of exclusive and shared seize mechanisms, said apparatus comprising:
 (a) a counter and means for initializing said counter to keep track of shared read attempts with respect to a particular shared data object whenever a shared read access is initiated for that object;
 (b) means for incrementing said counter;
 (c) means for initializing a first check count variable by setting it equal to check count associated with said particular data object, wherein said means for initializing includes means for incrementing said check count variable whenever a modification is made to said particular data object under an exclusive seize;
 (d) a flux bit which is set whenever said particular data object is subject to an exclusive seize, and means for testing said flux bit;
 (e) means for reading said particular shared data object when said flux bit is reset and the value in said counter after said counter is incremented is less than a predetermined threshold value;
 (f) first means for determining if said particular data object is subject to an exclusive seize after said particular data object is read, said first means for determining including means for again testing said flux bit;
 (g) second means for determining whenever said particular data object is not subject to an exclusive seize after again testing said flux bit, if said particular data object was subject to an exclusive seize while it was being read; and
 (h) means for completing said shared read access without initiating a shared seize whenever it is determined that said particular data object was not subject to an exclusive seize while it was being read.

37. An apparatus for improving the performance of a computer system utilizing exclusive and shared seize mechanisms to assure the integrity of shared data objects, said apparatus comprising;
 (a) a flux bit and means for setting said flux bit whenever an exclusive write access is in progress and a shared data object is subject to an exclusive seize;
 (b) means for incrementing a check count whenever said shared data object is modified during said exclusive write access;
 (c) means for resetting said flux bit whenever said shared data object is no longer subject to said exclusive seize;
 (d) means for testing said flux bit whenever a shared read access for said shared data object is initiated; and
 (e) means for performing a shared seize with respect to said shared data object whenever a shared read access is initiated for said shared data object and said flux bit is set.

* * * * *